US009965222B1

(12) United States Patent
Brandl et al.

(10) Patent No.: US 9,965,222 B1
(45) Date of Patent: May 8, 2018

(54) SOFTWARE MODE REGISTER ACCESS FOR PLATFORM MARGINING AND DEBUG

(71) Applicant: Advanced Micro Devices, Inc., Sunnyvale, CA (US)

(72) Inventors: Kevin M. Brandl, Austin, TX (US); Scott P. Murphy, Sunnyvale, CA (US); James R. Magro, Austin, TX (US); Paramjit K. Lubana, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 22 days.

(21) Appl. No.: 15/299,994

(22) Filed: Oct. 21, 2016

(51) Int. Cl.
*G06F 3/06* (2006.01)
*G06F 11/07* (2006.01)

(52) U.S. Cl.
CPC .......... *G06F 3/0659* (2013.01); *G06F 3/0619* (2013.01); *G06F 3/0656* (2013.01); *G06F 3/0673* (2013.01); *G06F 11/073* (2013.01); *G06F 11/0793* (2013.01)

(58) Field of Classification Search
None
See application file for complete search history.

(56) References Cited

U.S. PATENT DOCUMENTS

| | | | |
|---|---|---|---|
| 7,610,455 B2 * | 10/2009 | Oh | G06F 13/4243 711/156 |
| 7,647,467 B1 | 1/2010 | Hutsell et al. | |
| 7,924,637 B2 | 4/2011 | Searles et al. | |
| 2010/0188918 A1 | 7/2010 | Fox et al. | |
| 2014/0149618 A1 | 5/2014 | Venkatesan et al. | |
| 2015/0078104 A1 | 3/2015 | Brandl et al. | |
| 2016/0132379 A1 | 5/2016 | Chen | |
| 2017/0109058 A1 * | 4/2017 | Shallal | G06F 3/0611 |

OTHER PUBLICATIONS

International Search Report and Written Opinion for International Application No. PCT/US2017/44143, dated Nov. 7, 2017, 15 pages.
JEDEC Solid State Technology Association, JEDEC Standard No. 79-4, "DDR4 SDRAM," 2012.
Samsung Electronics, "Device Operations DDR SDRAM," 2002.

* cited by examiner

*Primary Examiner* — Kevin Verbrugge
(74) *Attorney, Agent, or Firm* — Polansky & Associates, P.L.L.C.; Paul J. Polansky

(57) ABSTRACT

A data processing system includes a memory channel and a data processor coupled to the memory channel. The data processor includes a memory controller coupled to the memory channel and is adapted to access at least one rank of double data rate memory. The memory controller includes a command queue for storing received memory access requests, and an arbiter for picking memory access requests from the command queue, and then providing the memory access requests to the memory channel. The memory access requests are selected based on predetermined criteria, and in response to a mode register access request to quiesce pending operations. Additionally, the memory controller includes a mode register access controller that in response to the mode register access request, generates at least one corresponding mode register set command to a memory bus. The memory controller then relinquishes control of the memory bus to the arbiter thereafter.

29 Claims, 10 Drawing Sheets

SOFTWARE MODE REGISTER ACCESS FOR PLATFORM MARGINING AND DEBUG

BACKGROUND

Dynamic random access memory (DRAM) chips, formed of large arrays of capacitors with sub-micron features, are utilized for main memory in computer systems. DRAM is relatively inexpensive and high density, thereby enabling large amounts of DRAM to be integrated per device. Most DRAM chips sold today are compatible with various double data rate (DDR) DRAM standards promulgated by the Joint Electron Devices Engineering Council (JEDEC).

Some DDR memory chips can be periodically recalibrated to adjust certain operating parameters for changes in operating conditions such as temperature and voltage. For example, DDR3 and DDR4 allow periodic recalibration of output buffer impedance, known as "ZQ calibration", and DDR4 allows periodic internal reference voltage recalibration, known as "VREFDQ training". Moreover, when the DRAM chips are included in dual inline memory modules (DIMMs) they may optionally include a data buffer that itself has timing parameters that need to be recalibrated.

For example, in DDR4 DRAM chips, the VREFDQ values are configured by a host DDR controller during initialization and may be recalibrated during operation. The VREFDQ values are configured via certain mode register set commands. VREFDQ is preferably retrained during operation as conditions change, such as the board heating up, power supply drift, etc. Retraining can be disruptive and cause poor performance when done through existing software mechanisms. Additionally, in order to update a VREFDQ value on DDR4 DRAM chips, the JEDEC specification requires a specific sequence of multiple mode register set commands, and does not allow other intervening DRAM commands during the sequence. The current JEDEC standard makes it difficult to utilize single-test mode register commands via scripting tools, such as Hardware Debug Tool, for example.

Figure 1:
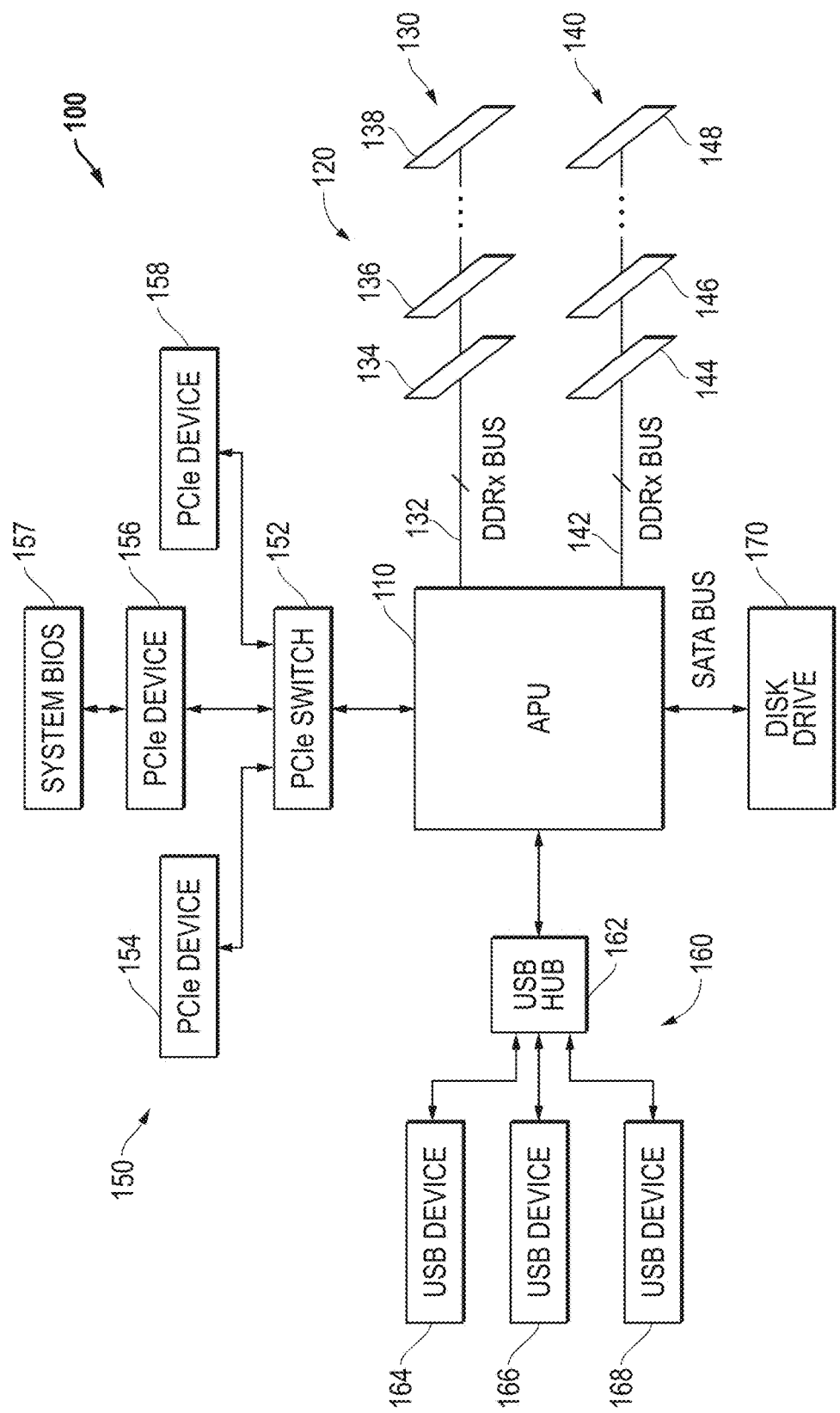
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below in one form, a data processing system includes a memory channel and a data processor coupled to the memory channel. The data processor includes a memory controller coupled to the memory channel and is adapted to access at least one rank of double data rate memory. The memory controller includes a command queue for storing received memory access requests, and an arbiter for picking memory access requests from the command queue, and then providing the memory access requests to the memory channel. The memory access requests are selected based on predetermined criteria, and in response to a mode register access request to quiesce pending operations. Additionally, the memory controller includes a mode register access controller that in response to the mode register access request, generates at least one corresponding mode register set command to a memory bus. The memory controller then relinquishes control of the memory bus to the arbiter thereafter.

In another form, a data processor includes a memory accessing agent and a memory controller coupled to the memory accessing agent. The memory controller is adapted to couple to a memory system, and includes a command queue for storing received memory access requests, an arbiter, and a mode register. The arbiter selectively picks memory access requests from the command queue and provides the memory access requests to a memory channel, as well as in response to the mode register access request. The requests are provided to the memory channel to quiesce pending operations. In response to the mode register access request, the mode register access controller generates at least one corresponding mode register set command to a memory bus, and relinquishes control of the memory bus to the arbiter, thereafter.

In still another form, there is described a method for margining and testing a double data rate interface in a memory system via a mode register access controller. A request to generate double data rate operations is received at a time subsequent to system initialization. A request to quiesce current and pending double data rate operations of a rank is generated. A mode register set command sequence is received at a memory bus. In response to receipt of the mode register command sequence, a first mode register command sequence is sent to a plurality of banks in the rank to obtain control of a first parameter associated with the rank. A subsequent mode register command sequence is sent to the plurality of banks to update the first parameter associated with said rank.

Moreover, in yet another form, there is described a method for margining and testing a double data rate data buffer interface in a memory system via a mode register access controller. A request to generate a buffer control word write command sequence subsequent to initialization of a double data rate data buffer is received at a time subsequent initialization. The arbiter enables the quiesce of current and pending double data rate buffer operations. Buffer control word write command sequences are distributed to modify at least one parameter from amongst a voltage parameter and a data buffer timing parameter.

FIG. 1 illustrates in block diagram form a data processing system 100 according to some embodiments. Data processing system 100 includes generally a data processor 110 in the form of an accelerated processing unit (APU), a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a DDRx bus 132, including representative DIMMs 134, 136, and 138 that in this example correspond to separate ranks. Likewise, memory channel 140 includes a set of DIMMs connected to a DDRx bus 142, including representative DIMMs 144, 146, and 148.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like.

Data processing system 100 is suitable for use in modern computing applications by providing a memory channel 130 and a memory channel 140. Each of memory channels 130 and 140 can connect to state-of-the-art DDR memories such as DDR version 4 (DDR4), low power DDR4 (LPDDR4), graphics DDR version five (gDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Figure 2:
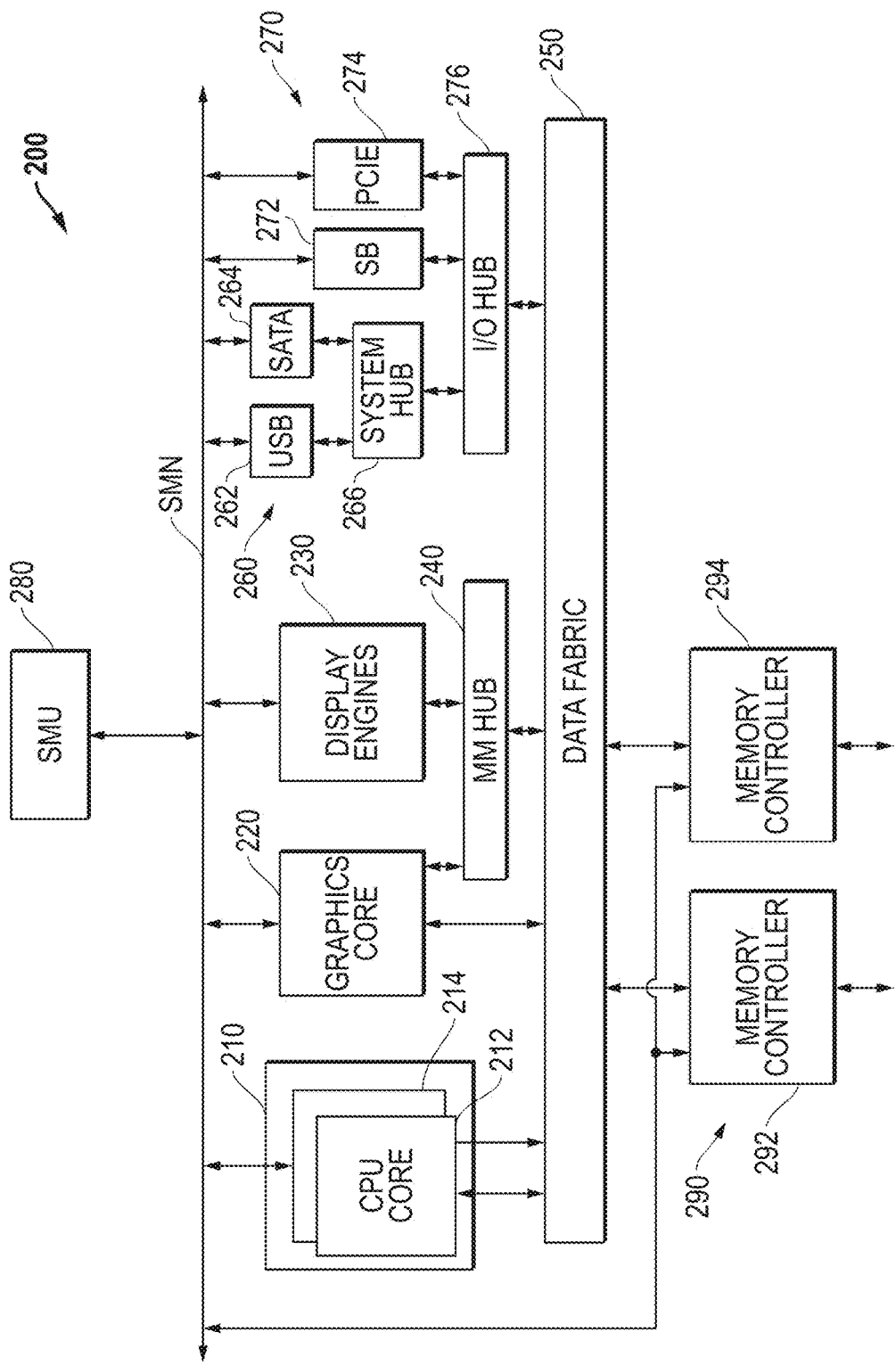
FIG. 2 illustrates in block diagram form an accelerated processing unit (APU) suitable for use in the data processing system of FIG. 1.

FIG. 2 illustrates in block diagram form an APU 200 suitable for use in data processing system 100 of FIG. 1. APU 200 includes generally a central processing unit (CPU) core complex 210, a graphics core 220, a set of display engines 230, a memory management hub 240, a data fabric 250, a set of peripheral controllers 260, a set of peripheral bus controllers 270, a system management unit (SMU) 280, and a set of memory controllers 290.

CPU core complex 210 includes a CPU core 212 and a CPU core 214. In this example, CPU core complex 210 includes two CPU cores, but in other embodiments CPU core complex can include an arbitrary number of CPU cores. Each of CPU cores 212 and 214 is bi-directionally connected to a system management network (SMN), which forms a control fabric, and to data fabric 250, and is capable of providing memory access requests to data fabric 250. Each of CPU cores 212 and 214 may be unitary cores, or may further be a core complex with two or more unitary cores sharing certain resources such as caches.

Graphics core 220 is a high performance graphics processing unit (GPU) capable of performing graphics operations such as vertex processing, fragment processing, shading, texture blending, and the like in a highly integrated and parallel fashion. Graphics core 220 is bidirectionally connected to the SMN and to data fabric 250, and is capable of providing memory access requests to data fabric 250. In this regard, APU 200 may either support a unified memory architecture in which CPU core complex 210 and graphics core 220 share the same memory space, or a memory architecture in which CPU core complex 210 and graphics core 220 share a portion of the memory space, while graphics core 220 also uses a private graphics memory not accessible by CPU core complex 210.

Display engines 230 render and rasterize objects generated by graphics core 220 for display on a monitor. Graphics core 220 and display engines 230 are bi-directionally connected to a common memory management hub 240 for uniform translation into appropriate addresses in memory system 120, and memory management hub 240 is bi-directionally connected to data fabric 250 for generating such memory accesses and receiving read data returned from the memory system.

Data fabric 250 includes a crossbar switch for routing memory access requests and memory responses between any memory accessing agent and memory controllers 290. It also includes a system memory map, defined by BIOS, for determining destinations of memory accesses based on the system configuration, as well as buffers for each virtual connection.

Peripheral controllers 260 include a USB controller 262 and a SATA interface controller 264, each of which is bi-directionally connected to a system hub 266 and to the SMN bus. These two controllers are merely exemplary of peripheral controllers that may be used in APU 200.

Peripheral bus controllers 270 include a system controller or "Southbridge" (SB) 272 and a PCIe controller 274, each of which is bi-directionally connected to an input/output (I/O) hub 276 and to the SMN bus. I/O hub 276 is also bi-directionally connected to system hub 266 and to data fabric 250. Thus for example a CPU core can program registers in USB controller 262, SATA interface controller 264, SB 272, or PCIe controller 274 through accesses that data fabric 250 routes through I/O hub 276.

SMU 280 is a local controller that controls the operation of the resources on APU 200 and synchronizes communication among them. SMU 280 manages power-up sequencing of the various processors on APU 200 and controls multiple off-chip devices via reset, enable and other signals. SMU 280 includes one or more clock sources not shown in FIG. 2, such as a phase locked loop (PLL), to provide clock signals for each of the components of APU 200. SMU 280 also manages power for the various processors and other functional blocks, and may receive measured power consumption values from CPU cores 212 and 214 and graphics core 220 to determine appropriate power states.

APU 200 also implements various system monitoring and power saving functions. In particular one system monitoring function is thermal monitoring. For example, if APU 200 becomes hot, then SMU 280 can reduce the frequency and voltage of CPU cores 212 and 214 and/or graphics core 220. If APU 200 becomes too hot, then it can be shut down entirely. Thermal events can also be received from external sensors by SMU 280 via the SMN bus, and SMU 280 can reduce the clock frequency and/or power supply voltage in response.

Figure 3:
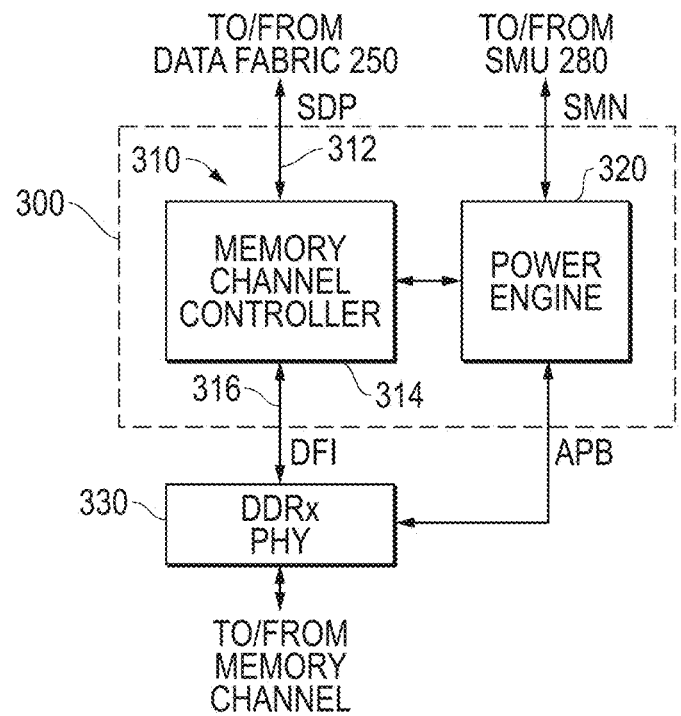
FIG. 3 illustrates in block diagram form a memory controller and associated physical interface (PHY) suitable for use in the APU of FIG. 2 according to some embodiments.

FIG. 3 illustrates in block diagram form a memory controller 300 and an associated physical interface (PHY) 330 suitable for use in APU 200 of FIG. 2 according to some embodiments. Memory controller 300 includes a memory channel 310 and a power engine 320. Memory channel 310 includes a host interface 312, a memory channel controller 314, and a physical interface 316. Host interface 312 bi-directionally connects memory channel controller 314 to data fabric 250 over a scalable data port (SDP). Physical interface 316 bi-directionally connects memory channel controller 314 to PHY 330 over a bus that conforms to the DDR-PHY Interface Specification (DFI). Power engine 320 is bi-directionally connected to SMU 280 over the SMN bus, to PHY 330 over the Advanced Peripheral Bus (APB), and is also bi-directionally connected to memory channel controller 314. PHY 330 has a bidirectional connection to a memory channel such as memory channel 130 or memory channel 140 of FIG. 1. Memory controller 300 is an instantiation of a memory controller for a single memory channel using a single memory channel controller 314, and has a power engine 320 to control operation of memory channel controller 314 in a manner that will be described further below.

Figure 4:
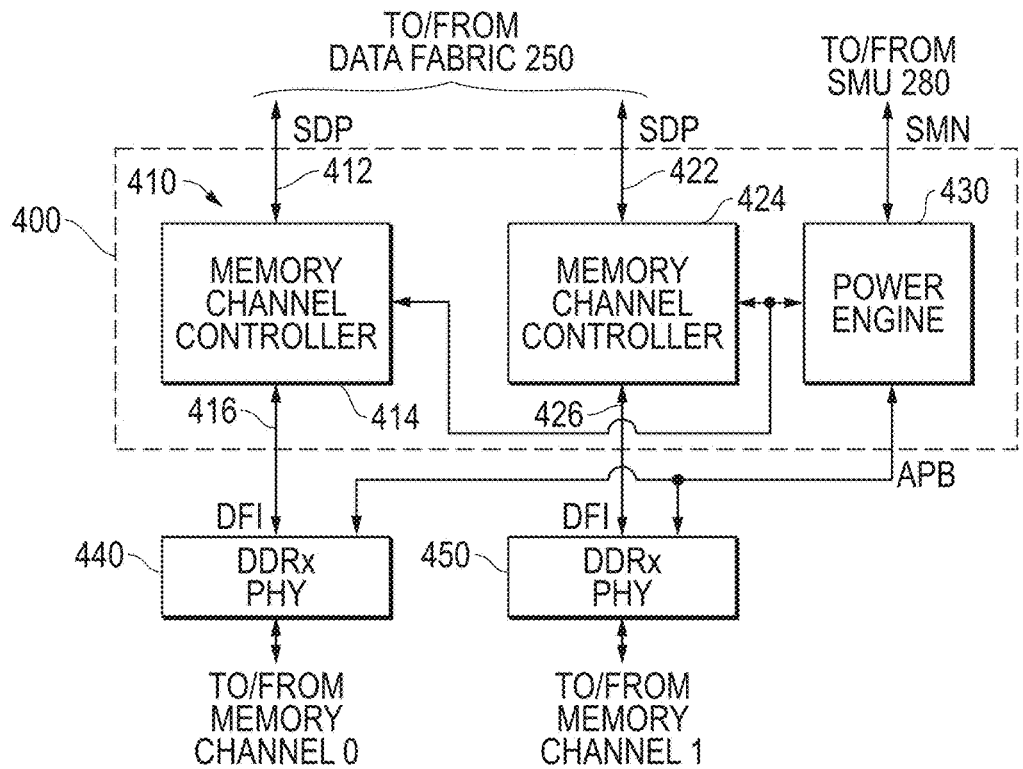
FIG. 4 illustrates in block diagram form another memory controller and associated PHY suitable for use in the APU of FIG. 2 according to some embodiments.

FIG. 4 illustrates in block diagram form another memory controller 400 and associated PHYs 440 and 450 suitable for use in APU 200 of FIG. 2 according to some embodiments. Memory controller 400 includes memory channels 410 and 420 and a power engine 430. Memory channel 410 includes a host interface 412, a memory channel controller 414, and a physical interface 416. Host interface 412 bi-directionally connects memory channel controller 414 to data fabric 250 over an SDP. Physical interface 416 bi-directionally connects memory channel controller 414 to PHY 440, and conforms to the DFI Specification. Memory channel 420 includes a host interface 422, a memory channel controller 424, and a physical interface 426. Host interface 422 bi-directionally connects memory channel controller 424 to data fabric 250 over another SDP. Physical interface 426 bi-directionally connects memory channel controller 424 to PHY 450, and conforms to the DFI Specification. Power engine 430 is bi-directionally connected to SMU 280 over the SMN bus, to PHYs 440 and 450 over the APB, and is also bi-directionally connected to memory channel controllers 414 and 424. PHY 440 has a bidirectional connection to a memory channel such as memory channel 130 of FIG. 1. PHY 450 has a bidirectional connection to a memory channel such as memory channel 140 of FIG. 1. Memory controller 400 is an instantiation of a memory controller having two memory channel controllers and uses a shared power engine 430 to control operation of both memory channel controller 414 and memory channel controller 424 in a manner that will be described further below.

Figure 5:
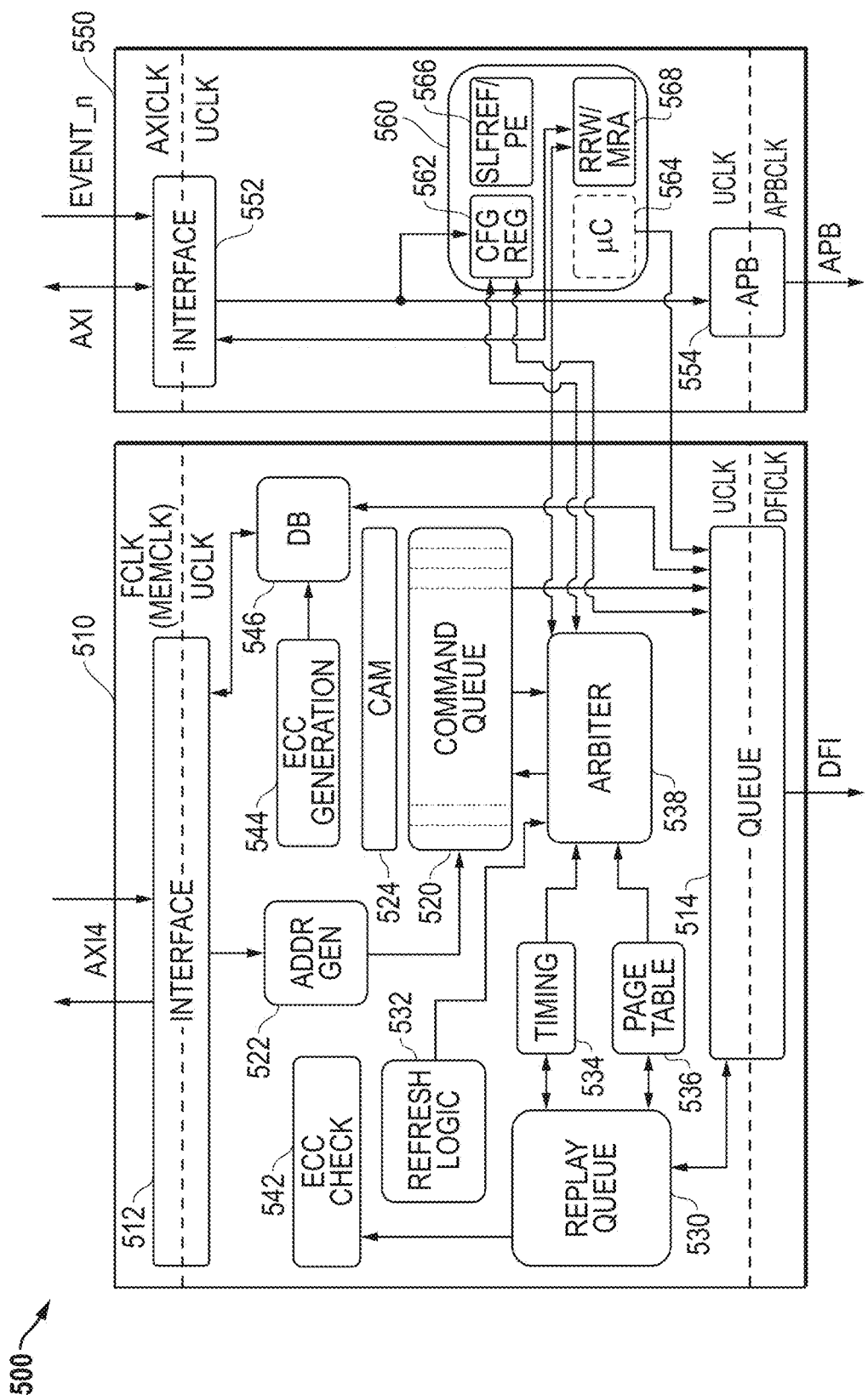
FIG. 5 illustrates in block diagram form a memory controller according to some embodiments.

FIG. 5 illustrates in block diagram form a memory controller 500 according to some embodiments. Memory controller 500 includes generally a memory channel controller 510 and a power controller 550. Memory channel controller 510 includes generally an interface 512, a queue 514, a command queue 520, an address generator 522, a content addressable memory (CAM) 524, a replay queue 530, a refresh logic block 532, a timing block 534, a page table 536, an arbiter 538, an error correction code (ECC) check block 542, an ECC generation block 544, and a data buffer (DB) 546.

Interface 512 has a first bidirectional connection to data fabric 250 over an external bus, and has an output. In memory controller 500, this external bus is compatible with the advanced extensible interface version four specified by ARM Holdings, PLC of Cambridge, England, known as "AXI4", but can be other types of interfaces in other embodiments. Interface 512 translates memory access requests from a first clock domain known as the FCLK (or MEMCLK) domain to a second clock domain internal to memory controller 500 known as the UCLK domain. Similarly, queue 514 provides memory accesses from the UCLK domain to the DFICLK domain associated with the DFI interface.

Address generator 522 decodes addresses of memory access requests received from data fabric 250 over the AXI4 bus. The memory access requests include access addresses in the physical address space represented in a normalized format. Address generator 522 converts the normalized addresses into a format that can be used to address the actual memory devices in memory system 120, as well as to efficiently schedule related accesses. This format includes a region identifier that associates the memory access request with a particular rank, a row address, a column address, a bank address, and a bank group. On startup, the system BIOS queries the memory devices in memory system 120 to determine their size and configuration, and programs a set of configuration registers associated with address generator 522. Address generator 522 uses the configuration stored in the configuration registers to translate the normalized addresses into the appropriate format. Command queue 520 is a queue of memory access requests received from the memory accessing agents in data processing system 100, such as CPU cores 212 and 214 and graphics core 220. Command queue 520 stores the address fields decoded by address generator 522 as well other address information that allows arbiter 538 to select memory accesses efficiently, including access type and quality of service (QoS) identifiers. CAM 524 includes information to enforce ordering rules, such as write after write (WAW) and read after write (RAW) ordering rules.

Replay queue 530 is a temporary queue for storing memory accesses picked by arbiter 538 that are awaiting responses, such as address and command parity responses, write cyclic redundancy check (CRC) responses for DDR4 DRAM or write and read CRC responses for gDDR5 DRAM. Replay queue 530 accesses ECC check block 542 to determine whether the returned ECC is correct or indicates an error. Replay queue 530 allows the accesses to be replayed in the case of a parity or CRC error of one of these cycles.

Refresh logic 532 includes state machines for various power-down, refresh, and termination resistance (ZQ) calibration cycles that are generated separately from normal read and write memory access requests received from memory accessing agents. For example, if a memory rank is in pre-charge power-down, it must be periodically awakened to run refresh cycles. Refresh logic 532 generates refresh commands periodically to prevent data errors caused by leaking of charge off storage capacitors of memory cells in DRAM chips. In addition, refresh logic 532 periodically calibrates ZQ to prevent mismatch in on-die termination resistance due to thermal changes in the system.

Arbiter 538 is bi-directionally connected to command queue 520 and configuration registers 562. Arbiter 538 is the heart of memory channel controller 510. It improves efficiency by intelligent scheduling of accesses to improve the usage of the memory bus. Arbiter 538 uses timing block 534 to enforce proper timing relationships by determining whether certain accesses in command queue 520 are eligible for issuance based on DRAM timing parameters. For example, each DRAM has a minimum specified time between active commands, known as "$t_{RC}$". Timing block 534 maintains a set of counters that determine eligibility based on this and other timing parameters specified in the JEDEC specification, and is bi-directionally connected to replay queue 530. Page table 536 maintains state information about active pages in each bank and rank of the memory channel for arbiter 538, and is bi-directionally connected to replay queue 530.

In response to write memory access requests received from interface 512, ECC generation block 544 computes an ECC according to the write data. DB 546 stores the write data and ECC for received memory access requests. It outputs the combined write data/ECC to queue 514 when arbiter 538 picks the corresponding write access for dispatch to the memory channel.

Power controller 550 generally includes an interface 552 to an advanced extensible interface, version one (AXI), an APB interface 554, and a power engine 560. Interface 552 has a first bidirectional connection to the SMN, which includes an input for receiving an event signal labeled "EVENT_n" shown separately in FIG. 5, and an output. APB interface 554 has an input connected to the output of interface 552, and an output for connection to a PHY over an APB. Power engine 560 has an input connected to the output of interface 552, and an output connected to an input of queue 514. Power engine 560 includes a set of configuration registers 562, a microcontroller (μC) 564, a self-refresh controller (SLFREF/PE) 566, and a reliable read/write mode register access (RRW/MRA) controller 568. Configuration registers 562 are bi-directionally connected to queue 514. Configuration registers 562 are programmed over the AXI bus, and store configuration information to control the operation of various blocks in memory controller 500. Accordingly, configuration registers 562 have additional outputs connected to these blocks that are not shown in detail in FIG. 5. Self-refresh controller 566 is an engine that allows the manual generation of refreshes in addition to the automatic generation of refreshes by refresh logic 532. RRW/MRA controller 568 provides a continuous memory access stream to memory or I/O devices for such purposes as DDR interface maximum read latency (MRL) training and loopback testing. RRW/MRA controller 568 additionally provides the logic that controls select operations of interface 552.

Memory channel controller 510 includes circuitry that allows it to pick memory accesses for dispatch to the associated memory channel. In order to make the desired arbitration decisions, address generator 522 decodes the address information into predecoded information including rank, row address, column address, bank address, and bank group in the memory system, and command queue 520 stores the predecoded information. Configuration registers 562 store configuration information to determine how address generator 522 decodes the received address information. Arbiter 538 uses the decoded address information, timing eligibility information indicated by timing block 534, and active page information indicated by page table 536 to efficiently schedule memory accesses while observing other criteria such as QoS requirements. For example, arbiter 538 implements a preference for accesses to open pages to avoid the overhead of precharge and activation commands required to change memory pages, and hides overhead accesses to one bank by interleaving them with read and write accesses to another bank. In particular during normal operation, arbiter 538 normally keeps pages open in different banks until they are required to be precharged prior to selecting a different page.

In operation, a memory controller such as memory controller 500 of FIG. 5 is connected to and receives memory access requests from a memory accessing agent, such as a CPU core in CPU core complex 210 or graphics core 220 of FIG. 2. Memory controller 500 is also adapted to connect to memory system 120 of FIG. 1. As described above, memory system 120 can include multiple ranks of memory implemented as DIMMs 134, 136, and 138 in FIG. 1. Arbiter 538, within memory controller 500, picks memory access requests from command queue 520 based on predetermined criteria. Arbiter 538 performs read and write accesses, as well as refreshes, and is responsive to requests from the RRW/MRA controller 568. In response to at least one DDR memory bus access request, RRW/MRA controller 568 generates a request to arbiter 538 to relinquish control of the DDR memory bus. Arbiter 538 relinquishes control of the memory bus to the RRW/MRA controller 568 to generate a series of specified operations, e.g. particular Mode Register Set (MRS) commands to implement VREFDQ training.

In general, configuration register 562 receives a recalibration write command requests via interface 552. During mission mode high-bandwidth data-transfer, recalibration write command requests are provided through interface 512. In response to the write command requests, RRW/MRA controller 568 submits a request to arbiter 538 to obtain control of the memory bus. In response to the request from RRW/MRA controller 568, arbiter 538 quiesces pending operations. Quiescing the pending operations may include, but is not limited to, completing and halting current and pending operations associated with the target bus. Quiescing the bus may additionally include determining that no urgent refresh commands are pending. Subsequent to arbiter 538 quiescing current and pending operations associated with a target rank, RRW/MRA controller 568 executes the series of MRS commands. After completion of the series of MRS commands, RRW/MRA controller 568 returns control of the memory bus to arbiter 538 to resume normal read and write memory bus operations. By providing a side channel to take control of the memory bus with only a small amount of disruption to the flow of memory access requests and refreshes to the memory, memory controller 500 allows periodic recalibration of parameters without significantly sacrificing performance or increasing access latency.

Figure 6:
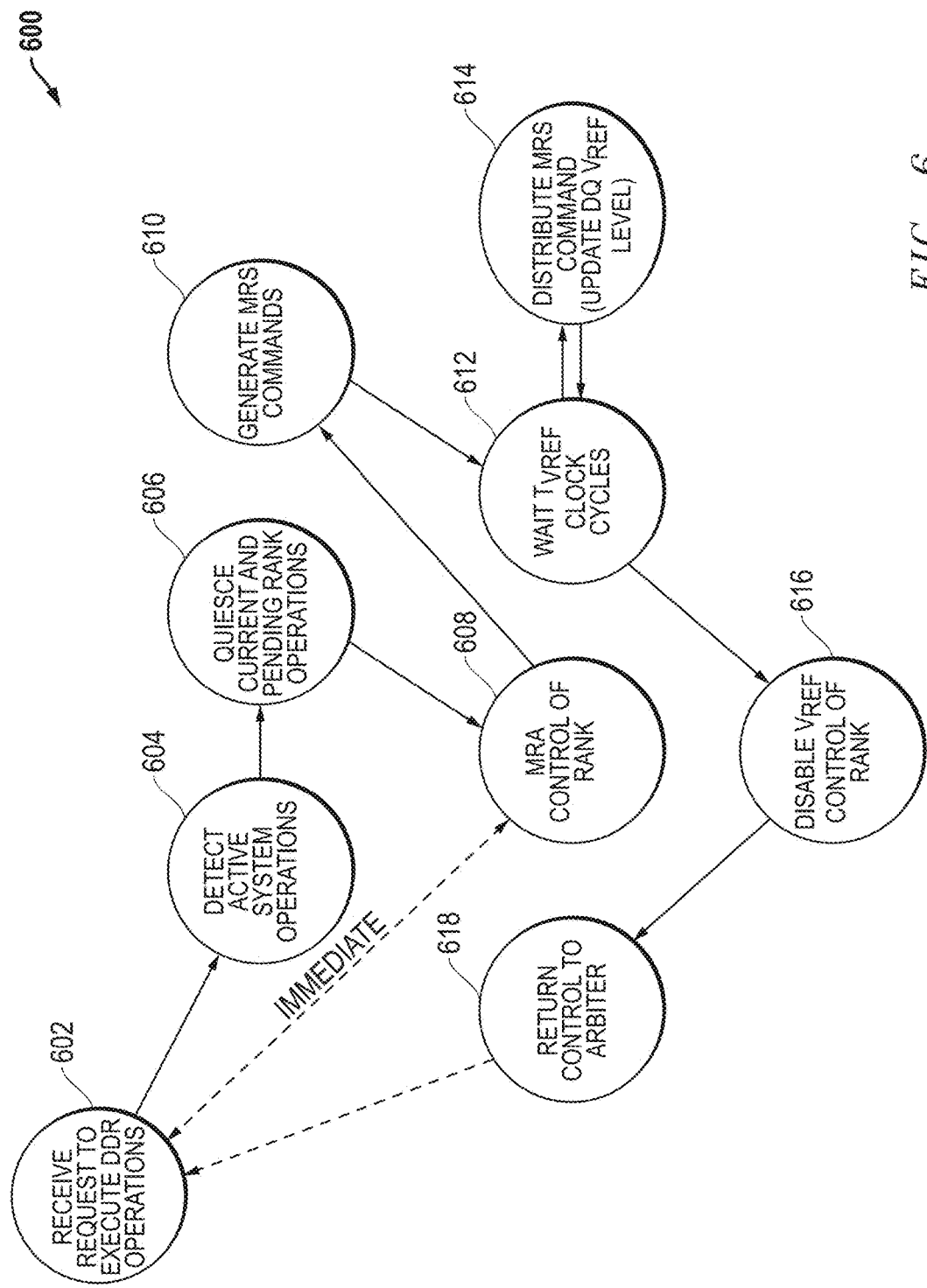
FIG. 6 illustrates in state diagram form state transitions to enable mode register set write commands according to some embodiments.

FIG. 6 illustrates a state diagram 600 that may be used by memory controller 500 of FIG. 5 according to some embodiments. State diagram 600 is a diagram of states that correspond to margining and test commands to be utilized by memory controller 500 to write and read parameters of double data rate memory. State diagram 600 includes a request state 602, a detect state 604, a quiesce state 606, a generate state 610, a MRA control state 608, a wait state 612, a distribution state 614, a disable state 616, and arbiter control state 618. State diagram 600 represents state transitions by arrows, and memory controller 500 performs the state transitions in response to corresponding requests.

State diagram 600 presents states of a state machine that correspond to the previously described memory controller operations. At request state 602, RRW/MRA controller 568 receives a request from the operating system. Request state 602 corresponds to a request to access configuration registers 562, in order to execute at least one MRS command. The request selects the rank of DRAMs to which the state machine will send the MRS command. In one embodiment, DRAM devices provide the support to generate MRS commands to a particular DRAM device of a rank utilizing per DRAM accessibility (PDA) MRS commands. The PDA feature is utilized to program predetermined parameters, for example, on die termination (ODT) values and internal reference voltage values on DRAM devices on a given rank.

At detect state 604, arbiter 538 detects any active system operations. In response to the request to access a mode register, during active system operations, arbiter 538 quiesces pending operations (including normal read and write operations as well as pending refreshes) to the memory channel by waiting for them to complete. The quiesce of current and pending memory rank operations corresponds with quiesce state 606. Quiescing the memory bus temporarily places the DRAM(s) in an idle state. The mode register contents can be changed during normal operation of the operating system when the DRAM is in the idle state, or the DIMMs are in the precharged state with timing parameters satisfied. Subsequent to quiesce of the current and pending operations, arbiter 538 relinquishes control of the memory bus to configuration registers 562.

At MRA control state 608, the mode register access controller assumes control of the targeted rank, and the mode registers are programmed to execute the modified parameter values. Responsively, at generate state 610, RRW/MRA controller 568 generates at least one corresponding mode register set command to a memory bus associated with DIMMs 134, 136, and 138, for example DDRx bus 132. The MRS command, at generate state 610, is one of a DRAM mode register write command sequence, a register control word command sequence, and a data buffer control word write command sequence. The MRS command cycle time is required to complete the write operation to the mode register and is the minimum time required between MRS commands.

Therefore, at wait state 612 mode register set command cycle times are satisfied for each MRS command. When programming the mode registers, address fields within the accessed mode register are redefined when the RRW/MRA controller 568 issues the MRS commands. MRS commands are distributed and redistributed to the memory bus at distribution state 614. RRW/MRA controller 568 cycles between distribution state 614 and wait state 612 following execution of each MRS command to satisfy the minimum time required between executions of MRS commands. Although some mode registers have default values defined, not all mode registers have default values defined, and therefore contents of the mode registers are also initialized and/or reinitialized (i.e. written) at distribution state 614, when necessary. A predetermined number of clock cycles are executed before more mode register set commands are executed.

In response to execution of the final received mode register set command, wait state 612 executes a determined number of clock cycles, and transitions to disable state 616. At disable state 616 modifications of the target parameter are stopped. RRW/MRA controller 568 returns control of the memory bus to the arbiter at arbiter control state 618. Returning back to request state 602, memory controller waits for the next request to modify and/or read at least one DRAM parameter.

In one embodiment, when the MRS command is a mode register write command sequence, the write command sequence is distributed to all DRAMs in a rank of double data rate memory. The mode register write command sequence enables at least one of a voltage parameter, a timing parameter, and a predetermined alternate device parameter associated with the DRAMS in the rank of double data rate memory to be updated. In one example, when a request is made to update an internal reference voltage, at receipt of the generated MRS command, at least part of the MRS command is received at mode register six (MR6) associated with at least one rank of double data rate memory. In response to receipt of the MRS command, the process waits a predetermined number of voltage reference memory clock cycles at wait state 612 before executing a subsequent MRS command.

In another embodiment, a request is received to take immediate control of a parameter associated with the DDR device. In response to request to access the memory bus immediately, arbiter 538 is bypassed. A direct MRS command is generated to the memory bus (DDRx bus 132), enabling immediate control of the memory bus to be obtained.

Figure 7:
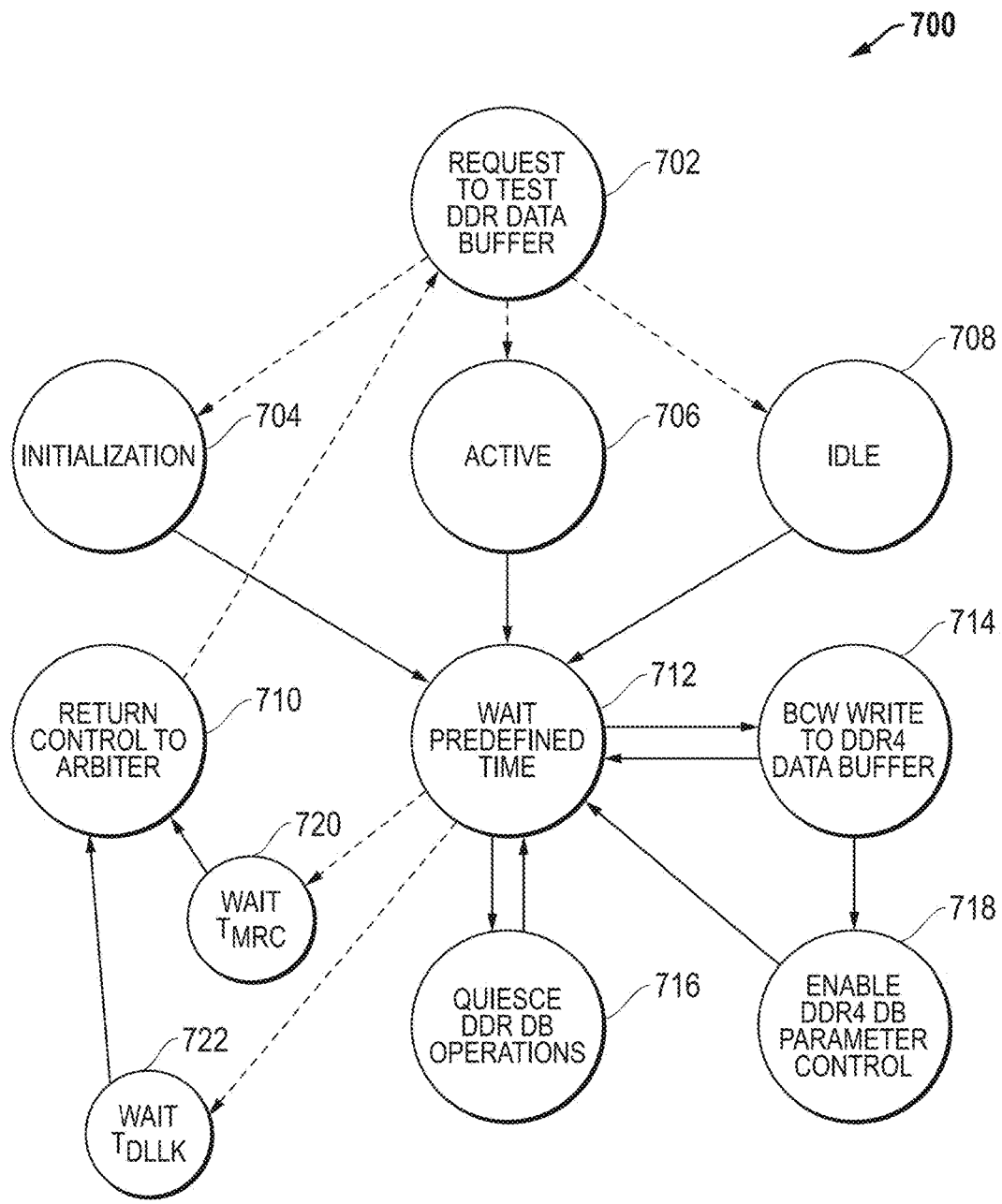
FIG. 7 illustrates in state diagram form state transitions for double data rate data buffer operations according to some embodiments.

FIG. 7 illustrates state diagram 700 that may be used by memory controller 500 of FIG. 5 according to some embodiments. State diagram 700 is a diagram of states that correspond to margining and test commands to be utilized by memory controller 500 to read and update parameters of a data buffer associated with double data rate memory. State diagram 700 includes a request state 702, an initialization state 704, an active state 706, an idle state 708, an arbiter control state 710, a wait state 712, a write state 714, quiesce state 716, enable state 718, wait time state 720, and wait state 722.

In operation, buffer control word (BCW) writes are sent to the data buffer associated with DIMMs 134, 136, and 138 from the registering clock driver (RCD) as a command sequence through a bus associated with the data buffer, for example a buffer control bus, or DDRx bus 132. Configuration registers 562 receive the command sequence. Arbiter 538 picks memory access requests to read or write commands to the data buffer from command queue 520 based on predetermined criteria. The predetermined criteria may include refresh requests, urgent refresh requests, chronological ordered requests, and prescheduled distribution requests. In response to receiving the request to access the data buffer, the RRW/MRA controller 568 instructs arbiter 538 to quiesce the current and pending activity of the memory bus. The RRW/MRA controller 568 takes control of the memory bus to modify predetermined parameters, such as internal reference voltage parameters and data buffer timing values, via BCW write command sequences. BCW write command sequences that modify predetermined data buffer parameters are sent to the data buffers associated with DIMMs 134, 136, and 138 from the registering clock driver (RCD) as a command sequence through the buffer control bus. Changes to the data buffer parameters utilizing control words within the BCW write command sequence require time for the device to settle. When executing the BCW write command sequences, the memory controller 500 waits a predetermined number of clock cycles ($t_{MRC}$) after the last control word access before further access to the DRAM can take place. For changes or writes to the clock timing, the settling may take up to $t_{DLLK}$ time.

State diagram 700 further presents states of a state machine that correspond to DIMM data buffer training and margining operations previously described for execution via memory controller 500. As further illustrated by state diagram 700, RCD receives a request to access and update a parameter associated with DIMMs 134, 136, and 138 at initialization state 704, active state 706, or idle state 708 of the operating system. Initialization state 704 corresponds to the start-up state of the operating system. Multiple functions may be associated with active state 706. In one embodiment, the activity associated with data processing system 100 may range from full mission mode traffic operation to minimal mission mode traffic operation. Idle state 708 corresponds to an inactive, yet functional data processing system 100. In response to receipt of the request to access the data buffer during initialization state 704, active state 706, or idle state 708, memory controller 500 makes a transition to wait state 712. Wait state 712 is a predefined wait time utilized to prepare the data buffer for execution of the BCW write command sequence. Arbiter 538 enables the RRW/MRA controller 568 to take control of the memory bus at state 718. Subsequent to the completion of predetermined wait cycles associated with wait state 712, arbiter 538 quiesces the current and pending operations associated with the data buffer. A transition is made back to wait state 712.

At state 716, configuration registers 562 request control of the memory bus from arbiter 538. When arbiter 538 has temporarily halted activity associated with the memory bus, arbiter 538 relinquishes control of the memory bus to configuration registers 562. Data buffer write operations are executed via the RRW/MRA controller 568 utilizing BCW write command sequences generated at write state 714. In one embodiment, the BCW command sequence corresponds to a BCW read command sequence. In one embodiment, subsequent to each BCW write and read command sequence, five data transfer cycles and a parity data transfer cycle are executed. The generated BCW write command sequences are sent to the DDR data buffers of a rank from the DDR4 registering clock driver, at write state 714, as a command sequence through the buffer control bus. Changes to the buffer control words and parameter settings require time for the device to settle. The BCW time ($t_{BCW}$) parameter indicates the time utilized to transition from the active BCW write command to a subsequent valid BCW write command. The predetermined number of cycle transitions corresponds to a number of transitions to wait cycle 712 in between BCW write commands, at write state 714.

The DDR BCW write command sequence is distributed to at least one rank of DDR memory subsequent to changes of the buffer control settings, at write state 714, memory controller 500 transitions to wait state 720 for execution of the predetermined number of clock cycles, $T_{MRC}$. The transition to wait state 720 occurs after the last control word access, before further access to the DRAM can occur. For changes to the clock timing, at write state 714, memory controller 500 transitions to wait state 722. In response to a final transition to wait state 712, a transition is made to an additional cycle time, at least one of wait state 720 and wait state 722. Wait state 722 corresponds to a predetermined number of clock cycles, $t_{DLLK}$, executed following changes to timing parameters, then memory controller 500 enables arbiter 538 to regain control of the memory bus, at state 710.

In one embodiment, at least one data buffer parameter is selected from among a voltage reference parameter, a timing control parameter, a predetermined alternate buffer parameter, and an alternate data buffer parameter. For example, DIMM data buffer parameters may include, but are not limited to, reference voltage operating range, reference voltage step size, reference voltage set tolerance, reference voltage step time, reference voltage valid tolerance, and clock timing. Timing control parameters are received at a timing control register of the data buffer of the associated rank of double data rate memory. Further, the DIMM data buffers support a feature in the buffer control word access transactions, called per buffer addressability (PBA). Each data buffer can be configured independently from each other. PBA allows independent parameter modification and training per buffer or independent on ODT impedance settings for predetermined DIMM data buffers. The PBA feature is enabled by a BCW bit stored in a word that does not contain any registers that need to be programmed in PBA mode; thereby enabling the buffers to get in and out of PBA mode without having to modify BCW bits that have been programmed specifically per buffer.

Any of a number of conditions for switching between states of FIG. 6 and FIG. 7 can be used alone or in various combinations. In the illustrated embodiment, these conditions include the generation of read or write command sequences, timing wait cycles, memory bus access, arbiter control, and quiesce of pending operations. Moreover, while FIG. 6 and FIG. 7 may show the margining and training for a single device in a given rank of memory (i.e., PDA and PBA), the FIG. 6 and FIG. 7 state machines can be extended to larger subsets of the memory system in various ways, such as for a single rank and multiple ranks.

Figure 8:
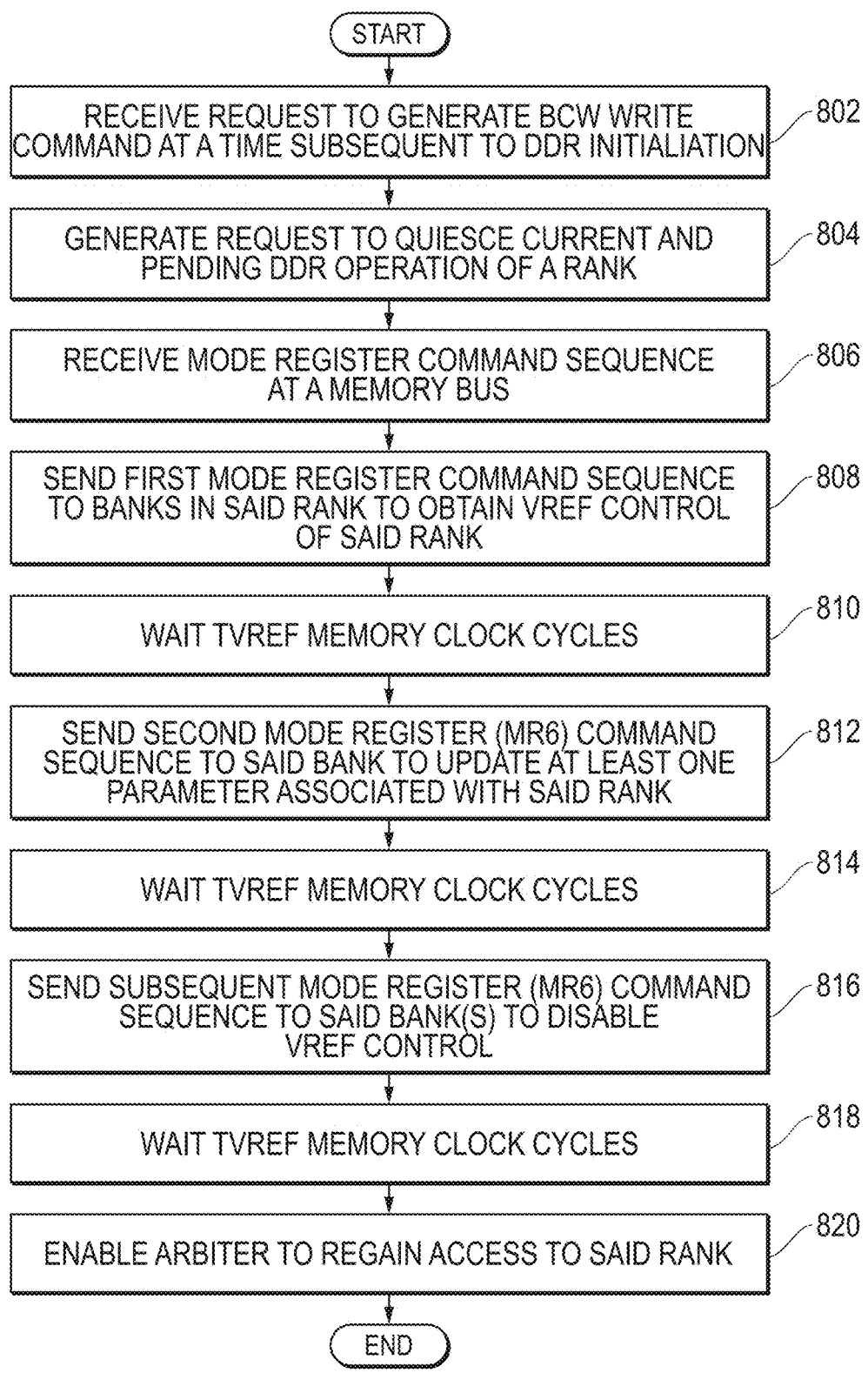
FIG. 8 illustrates a flow diagram for double data rate operations that may be used by the memory controller of FIG. 5 according to some embodiments.

FIG. 8 illustrates a flow diagram of method 800 that may be used by memory controller 500 of FIG. 5. At block 802 a request is received from the operating system to generate at least one DDR training and margining operation at a time subsequent to system initialization. RRW/MRA controller 568 generates a request to arbiter 538 to quiesce current and pending double data rate operation of a rank, at block 804. At block 806 a MRS command is received at a memory bus, for example DDRx bus 132. In response to receipt of the MRS command at the memory bus, at block 808, a first MRS command is sent to a rank, via the RRW/MRA controller 568, to obtain control of the predetermined DDR memory device parameter, for example the VREFDQ parameter, of the rank. A predetermined number of clock cycles ($t_{VREF}$) are executed at block 810. At block 812, a second mode register command sequence is sent to the rank to update at least one DDR4 memory device parameter associated with the rank. Subsequent to execution of the DDR4 memory device parameter modification, at block 814, a predetermined number of clock cycles are executed. RRW/MRA controller 568 sends a subsequent MRS command to the rank to disable parameter control. An additional predetermined number of clock cycles are executed at block 818. At block 820 the arbiter is enabled to regain access to the memory bus. The process concludes at the end block.

Figure 9:
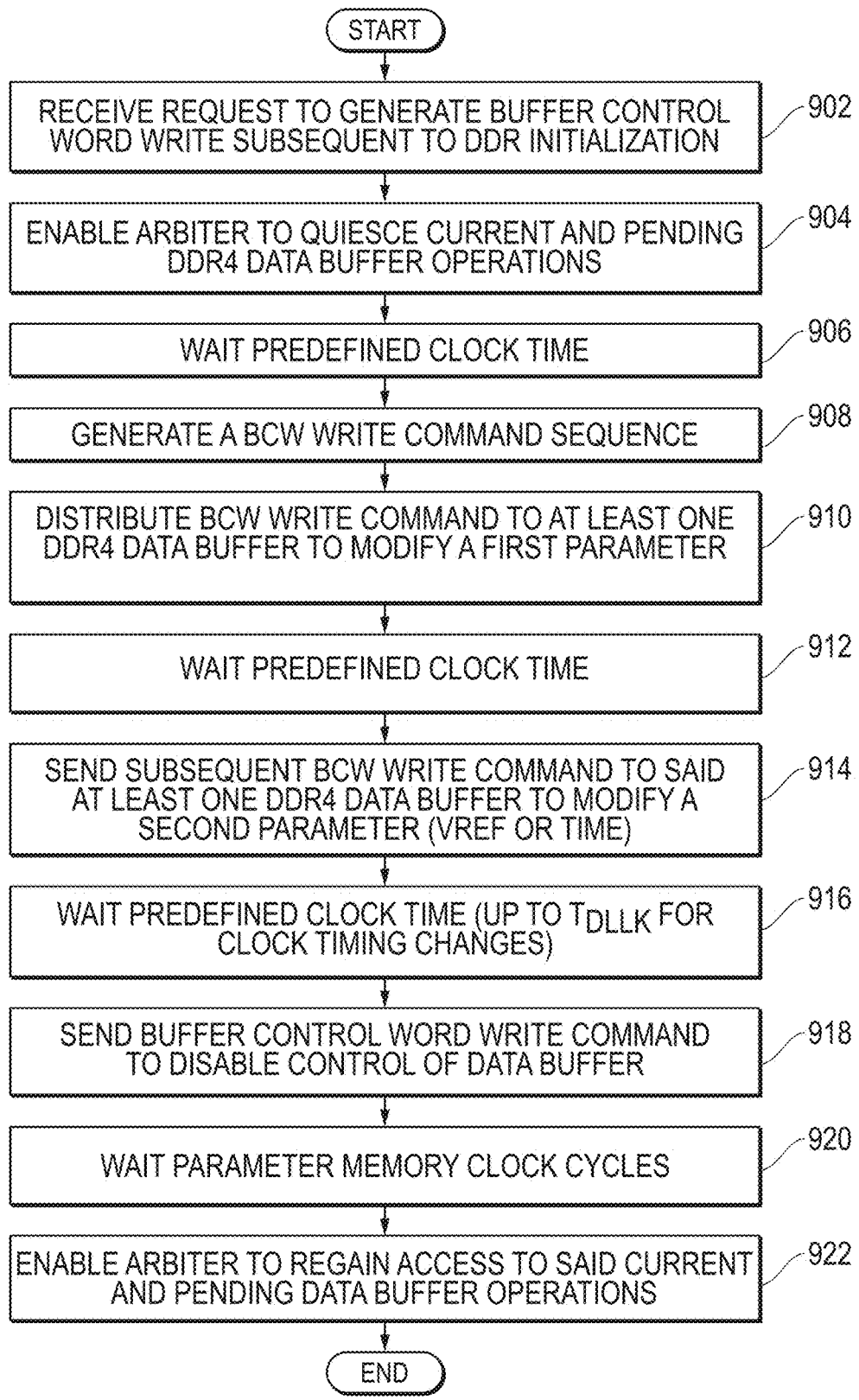
FIG. 9 illustrates a flow diagram for data buffer control operations that may be used by the memory controller of FIG. 5 according to some embodiments.

FIG. 9 illustrates a flow diagram of method 900 that may be used by memory controller 500 of FIG. 5. At block 902 a request is received to generate a BCW write command sequence to modify a predetermined data buffer parameter, at a time subsequent to system initialization. The RRW/MRA controller 568 requests control of the memory bus from arbiter 538. Memory controller 500 enables arbiter 538 to quiesce current and pending buffer operations, at block 904. At block 906 a predetermined number of clock cycles are executed. A BCW write command sequence is generated at block 908. In response to generation of the BCW write command sequence, at block 910, the BCW write command sequence is distributed to at least one data buffer to modify a first parameter. At block 912 a predetermined number of clock cycles are executed. A subsequent BCW write command sequence is sent to the data buffer to update a second parameter associated with the rank, at block 914. Subsequent to execution of the parameter update, at block 916, another predetermined number of clock cycles (up to $t_{DLLK}$) are executed. At block 918 a subsequent BCW write command sequence is sent to disable control of the data buffer. An additional number of predetermined clock cycles are executed at block 920. At block 922 the arbiter is enabled to regain access to current and pending data bus operations. The process concludes at the end block.

Figure 10:
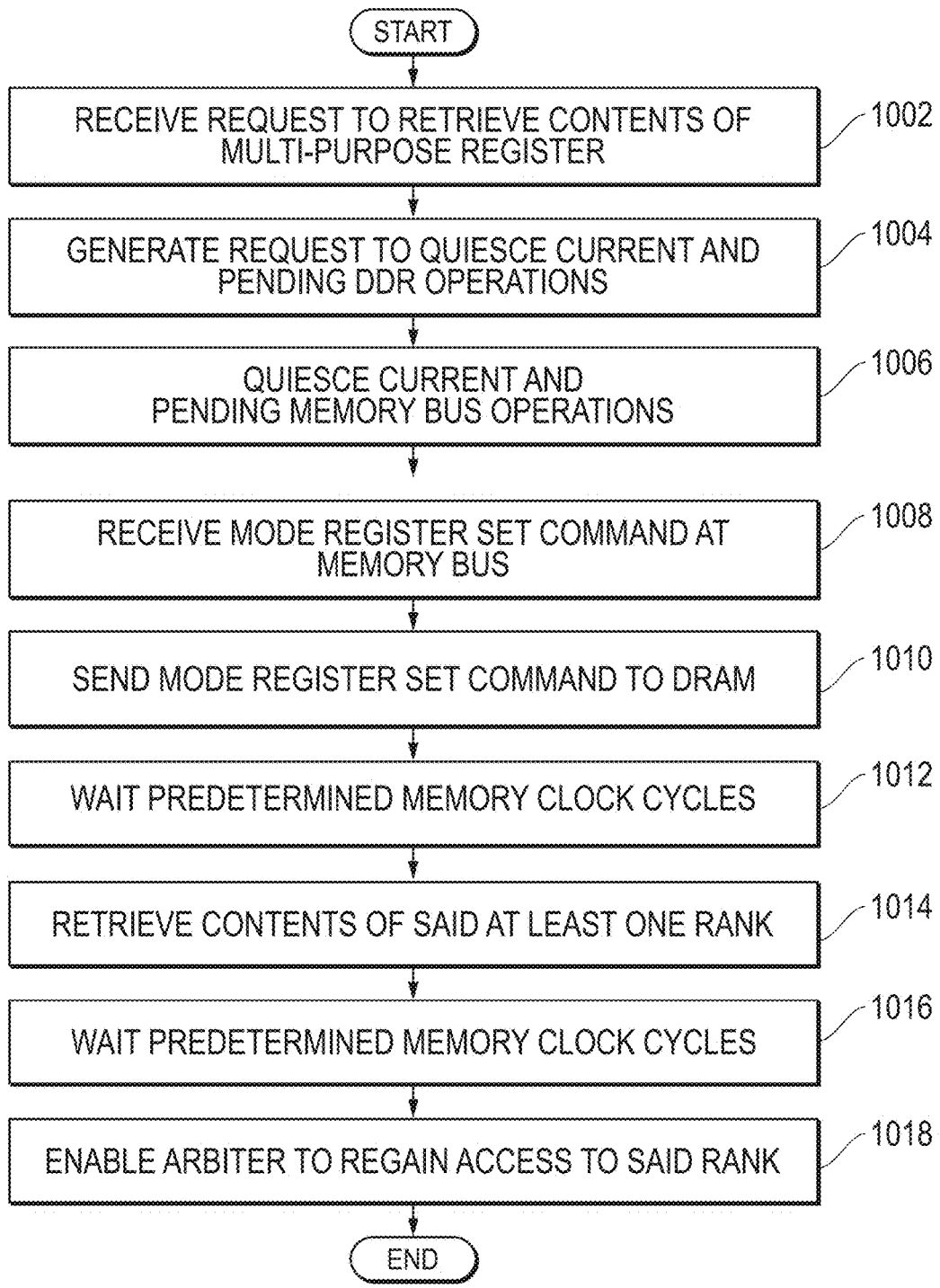
FIG. 10 illustrates a flow diagram for content retrieval of a multi-purpose register that may be used by the memory controller of FIG. 5 according to some embodiments.

FIG. 10 illustrates a flow diagram of method 1000 that may be used by memory controller 500 of FIG. 5. At block 1002 a request is received at the RRW/MRA controller 568 to retrieve/read contents of a multi-purpose register. A request is generated by the RRW/MRA controller 568 and received at arbiter 538 to quiesce current and pending DDR memory bus operations of a DDR memory device, at block 1004. Memory controller 500 enables arbiter 538 to quiesce current and pending DDR4 memory bus operations, at block 1006. At block 1008 a MRS command is received at the memory bus. At least one MRS command is distributed to a rank to read predetermined parameter values associated with at least one DRAM device within the rank, at block 1010. At block 1012 a predetermined number of clock cycles are executed. Contents of the associated rank are retrieved/read, at block 1014. Subsequent to a read of the contents, at block 1016, a predetermined number of clock cycles are executed. At block 1018, the memory controller enables the arbiter to regain access to current and pending memory data bus operations. The process concludes at the end block.

Figure 11:
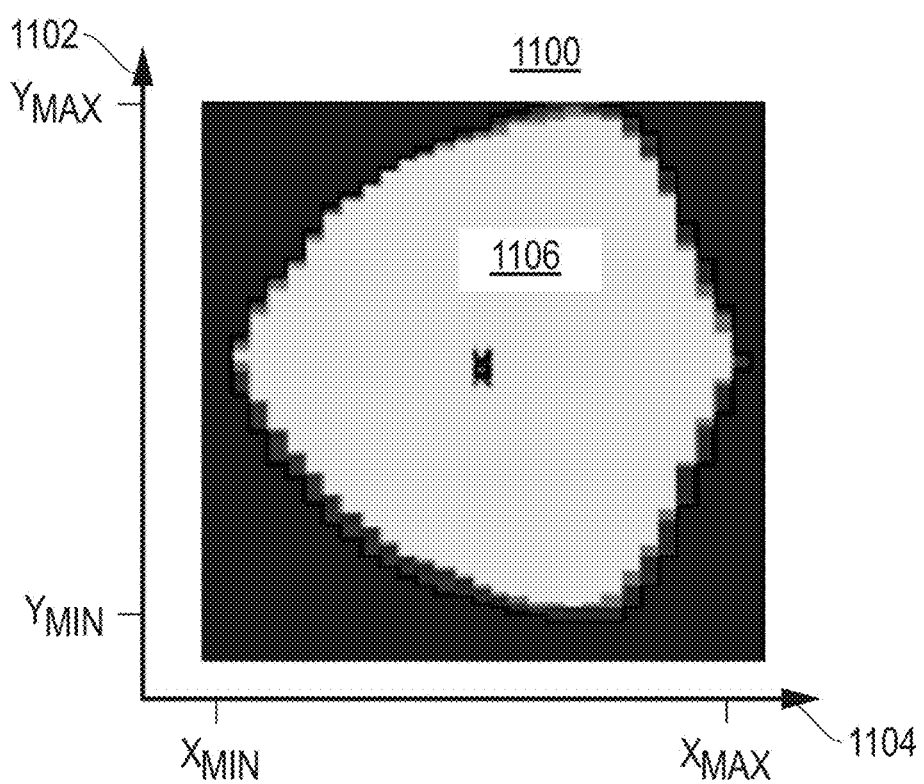
FIG. 11 illustrates a 2-dimensional data eye graphically displaying output values of a DRAM in response to a range of input values according to some embodiments.

FIG. 11 illustrates a 2-dimensional data eye graphically displaying output values of a DRAM in response to a range of input values. Data eye 1100 includes data eye 1106, axis 1102, and axis 1104. Axis 1102 displays a minimum and a maximum y-axis value, and axis 1104 displays a minimum and maximum x-axis value.

In one embodiment, data eye 1100 is a 2-dimensional data eye utilized to optimize predetermined parameters of the DRAM device. Subsequent to arbiter 538 quiescing the memory bus, the RRW/MRA controller 568 enables MRS commands to be distributed to the DRAM device to dynamically move the predetermined parameter values to the center of the data eye. Moving the predetermined parameter values to the center of the eye dynamically optimizes the parameter values associated with the DRAM device during testing and margining.

Some or all of the methods illustrated in FIG. 8, FIG. 9, and FIG. 10 may be governed by instructions that are stored in a computer readable storage medium and that are executed by at least one processor. Each of the operations shown in FIG. 8, FIG. 9, and FIG. 10 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

While particular embodiments have been described, various modifications to these embodiments will be apparent to those skilled in the art. Memory controller 500 may interface to other types of memory besides DDRx memory, such as high bandwidth memory (HBM), types of synchronous DRAM, and the like. While the illustrated embodiment showed each rank of memory corresponding to separate DIMMs, in other embodiments each DIMM can support multiple ranks. Moreover, the memory channel may include a plurality of ranks of DDR4 memory or just a single rank. Also while the operation of the MRA controller was described with reference to particular types of calibration such as ZQ calibration of VREDQ training, it should be apparent that it could be used for other types of calibration and training that are performed during operation.

Accordingly, it is intended by the appended claims to cover all modifications of the disclosed embodiments that fall within the scope of the disclosed embodiments.

What is claimed is:

1. A data processing system, comprising:
   a memory channel comprising at least one rank of double data rate memory comprising mode registers; and
   a data processor having a memory controller coupled to said memory channel and adapted to access said at least one rank of double data rate memory, wherein said memory controller comprises:
   a command queue for storing received memory access requests;
   an arbiter for picking memory access requests from said command queue based on predetermined criteria and providing said memory access requests to said memory channel, and in response to a mode register access request, to quiesce pending operations; and
   a mode register access controller that in response to said mode register access request generates at least one corresponding mode register set command to a memory bus, and relinquishes control of said memory bus to said arbiter thereafter.

2. The data processing system of claim 1, wherein said mode register access controller generates one of a DRAM mode register write command sequence, a register control word command sequence, and a data buffer control word write command sequence as said at least one mode register set command.

3. The data processing system of claim 2, wherein said mode register access controller distributes said DRAM mode register write command sequence to a plurality of DRAMs in at least one rank of DDR memory.

4. The data processing system of claim 3, wherein said mode register access controller generates said DRAM mode register write command sequence to said at least one rank of double data rate memory to update at least one of a voltage reference parameter, a timing parameter, and a predetermined alternate device parameter associated with said at least one rank of DDR memory.

5. The data processing system of claim 4, wherein:
   a DRAM mode register of said at least one rank of double data rate memory receives at least part of said DRAM mode register write command sequence; and
   said mode register access controller completes a predetermined number of voltage reference memory clock cycles prior to execution of a subsequent DRAM mode register write command sequence.

6. The data processing system of claim 4, wherein said mode register access controller provides a subsequent DRAM mode register write command sequence to said at least one rank of double data rate memory, and in response to receiving said subsequent DRAM mode register write command sequence, said mode register access controller updates said voltage reference parameter.

7. The data processing system of claim 2, wherein in response to generation of said data buffer control word write command sequence, said data buffer control word write command sequence is distributed to at least one data buffer of said at least one rank of double data rate memory.

8. The data processing system of claim 7, wherein said data buffer control word write command sequence modifies at least one data buffer parameter at a time subsequent to initialization of said at least one data buffer of said at least one rank of double data rate memory.

9. The data processing system of claim 8, wherein said at least one data buffer parameter, is selected from among a voltage reference parameter, a timing control parameter, and a predetermined alternate buffer parameter, and an alternate data buffer parameter.

10. The data processing system of claim 9, wherein said timing control parameter is received at a timing control register of said at least one data buffer of said at least one rank of double data rate memory.

11. The data processing system of claim 1, wherein in response to an immediate mode register access request, bypassing said arbiter, and generating a direct mode register set command to said memory bus to obtain immediate control of said memory bus.

12. A data processor comprising:
a memory accessing agent; and
a memory controller coupled to said memory accessing agent and adapted to couple to a memory system, wherein said memory controller comprises:
a command queue for storing received memory access requests;
an arbiter for selectively picking memory access requests from said command queue and providing said memory access requests to a memory channel, and in response to a mode register access request, to quiesce pending operations; and
a mode register access controller for generating at least one corresponding mode register set command to a memory bus, in response to said mode register access request, and relinquishes control of said memory bus to said arbiter thereafter.

13. The data processor of claim 12, wherein:
said mode register access controller generates a mode register set command, and
said mode register set command is one of a dynamic random-access memory (DRAM) mode register write command sequence, and a buffer control word write command sequence.

14. The data processor of claim 13, wherein said mode register access controller distributes said DRAM mode register write command sequence to a plurality of DRAMs in at least one rank of double data rate memory.

15. The data processor of claim 14, wherein:
said mode register access controller generates said DRAM mode register write command sequence to said at least one rank of double data rate memory;
said DRAM mode register write command sequence updates a voltage parameter; and
said voltage parameter is associated with said at least one rank of double data rate memory.

16. The data processor of claim 15, wherein:
said mode register access controller generates at least part of said DRAM mode register write command sequence to a DRAM mode register of said at least one rank of double data rate memory, and said mode register access controller waits a predetermined number of reference voltage memory clock cycles before executing a subsequent DRAM mode register write command sequence.

17. The data processor of claim 16, wherein:
said memory bus receives said subsequent DRAM mode register write command sequence at said at least one rank of double data rate memory, and in response to receiving said subsequent DRAM mode register write command, disables updates of said voltage parameter.

18. The data processor of claim 14, wherein in response to generating said buffer control word write command sequence, said memory bus distributes said buffer control word write command sequence to at least one data buffer of said at least one rank of double data rate memory.

19. The data processor of claim 12, wherein said mode register access controller updates at least one parameter, and wherein said at least one parameter is a DQ reference voltage value.

20. The data processor of claim 12, wherein said mode register access controller enables a bypass of said arbiter, and generates a direct mode register set command to said memory bus to obtain immediate control of said memory bus, in response to an immediate mode register access request.

21. A method for margining and testing a double data rate interface in a memory system via a mode register access controller, the method comprising:
receiving a request to generate double data rate operations at a time subsequent to system initialization;
generating a request to quiesce current and pending double data rate operations of a rank;
receiving a mode register command sequence at a memory bus;
in response to receipt of said mode register command sequence, sending a first mode register command sequence to a plurality of banks in said rank to obtain control of a first parameter associated with said rank; and
sending a subsequent mode register command sequence to said plurality of banks to update said first parameter associated with said rank.

22. The method of claim 21, further comprising initiating a wait cycle, wherein said wait cycle is a predetermined count of reference voltage memory clock cycles, initiated at a time succeeding execution of said subsequent mode register command sequence.

23. The method of claim 21, further comprising:
releasing a quiesce of current and pending double data rate operations of said rank, and
enabling operative access to said rank.

24. The method of claim 21, wherein sending a subsequent mode register command sequence further comprises:
sending a subsequent mode register write command to disable control of a reference voltage subsequent to completion of a predetermined number of reference voltage memory clock cycles; and
initiating a reference voltage memory clock cycle in response to receipt of said subsequent mode register command sequence.

25. The method of claim 21, wherein in response to said mode register access controller generating said subsequent mode register command sequence to said plurality of banks, said mode register access controller retrieving contents of a multi-purpose register associated with said double data rate operations, wherein said content corresponds to at least one operational capability of an associated double data rate DRAM.

26. A method for margining and testing a double data rate data buffer interface in a memory system via a mode register access controller, the method comprising:
   receiving a request to generate a buffer control word write command sequence subsequent to initialization of a double data rate data buffer;
   enabling a quiesce of current and pending double data rate data buffer operations; and
   distributing said buffer control word write command sequence to a double data rate data buffer to modify at least one parameter from amongst a voltage parameter and a data buffer timing parameter.

27. The method of claim 26, further comprising:
   initiating a wait cycle that is subsequent to each buffer control word write command sequence, wherein said wait cycle is a first predefined number of wait cycles; and
   in response to a modification of said data buffer timing parameter, initiating a second predefined number of wait cycles.

28. The method of claim 26, further comprising:
   sending a subsequent buffer control word write command sequence to disable said quiesce of current and pending double data rate operations of said double data rate data buffer, wherein arbiter access to said double data rate data buffer is enabled.

29. The method of claim 26, wherein said voltage parameter is a DQ reference voltage level.

* * * * *